US005408872A

United States Patent [19]

Nonaka

[11] Patent Number: 5,408,872

[45] Date of Patent: Apr. 25, 1995

[54] FUEL INJECTION CONTROL DEVICE FOR TWO STROKE COMBUSTION ENGINE

[75] Inventor: Kimihiro Nonaka, Hamamatsu, Japan

[73] Assignee: Sanshin Kogyo Kabushiki Kaisha, Hamamatsu, Japan

[21] Appl. No.: 71,410

[22] Filed: Jun. 4, 1993

[30] Foreign Application Priority Data

Jun. 24, 1992 [JP] Japan .................................. 4-188962

[51] Int. Cl.[6] .......................................... G01M 19/00

[52] U.S. Cl. ......................................................... 73/118.2

[58] Field of Search ..................... 73/118.2, 115, 117.3, 73/706, 861, 861.42, 118.2

[56] References Cited

U.S. PATENT DOCUMENTS 4,920,790 5/1990 Stiles et al. ......................... 73/118.2

5,134,984 8/1992 Nonaka et al. ...................... 123/494

*Primary Examiner*—Robert Raevis

*Attorney, Agent, or Firm*—Knobbe, Martens, Olson & Bear

[57] ABSTRACT

A two cycle, crankcase compression having fuel injection controlled in response to sensed intake air flow. The intake air flow is measured by measuring the crankcase pressure at crank angles corresponding to scavenge port opening and scavenge port closing of the engine. However, the actual angle at which the pressure is measured is adjusted to compensate for delay in the sensor reading and variations in the electric power supplied to the sensor. In addition, an arrangement is shown for protecting the sensor from corrosion.

27 Claims, 3 Drawing Sheets

FUEL INJECTION CONTROL DEVICE FOR TWO STROKE COMBUSTION ENGINE

BACKGROUND OF THE INVENTION

This invention relates to a fuel injection control device for a two stroke internal combustion engine and more particularly to an improved method of determining the air flow to such an engine for controlling the amount of fuel injected.

It is well known that the fuel requirements for an internal combustion engine are dependent upon the speed at which the engine operates and also the load on the engine. Although speed is a relatively easy characteristic to measure, load is not so easy to determine. In the crudest form of load measurement, it has been proposed to merely measure the position of the throttle valve of the engine in order to determine its load. However, the throttle valve position can be subject to fluxuation and its position per se is not always an indication of the instantaneous load on the engine. In addition, some forms of engines such as diesel engines do not have throttle valves and hence there is no throttle valve position to sense.

Air flow is a more accurate way of measuring the load on the engine inasmuch as the air flow to the engine is a relatively accurate indication of its load. In addition, it is desirable to maintain a certain fuel/air ratio and in order to maintain that, the amount of air consumed must be determined.

Various devices have been proposed for positioning in the induction system for measuring the air flow to the engine. These devices are such as rotating vanes or electrically heated wires which provide some indication of air flow. However, any device which is positioned in the induction system tends to restrict the air flow to the engine and can adversely affect its performance.

It has been found that the air flow to a two cycle, crankcase compression engine can be very accurately measured by measuring the difference in pressure in the crankcase at the time of scavenge port opening and at scavenge port closing. This pressure difference is a very accurate indication of the amount of air consumed by the cylinder per cycle. This can easily be measured by placing a crankcase pressure sensor in the crankcase and timing the taking of the pressure signals in relation to the timing of the scavenge port opening and closing.

The actual timing at which the pressure is sensed is important to having an accurate determination of air flow. However, the types of systems previously proposed have had some defects because of certain inherent lag in the system. For example, the construction of the sensor per se introduces a time lag in that the pressure output trace from the sensor does not completely accurately follow the actual crankcase pressure due to the inherent operation of the sensor. The effect of this will be described later by reference to FIG. 3.

Another defect inherent with the prior art type of constructions is that the pressure sensor is normally electrically operated and is driven by the charging coil of the ignition system of the engine. This is particularly true with outboard motor applications wherein a separate source of electric power may not be provided. The variation in output timing is thus dependent not only on the inherent construction of the sensor, which normally provides a fixed offset, but also at the speed which the engine is running, which provides a variable offset. This variable offset will be described later by reference to FIG. 4.

It is, therefore, a principal object to this invention to provide an improved device for measuring engine air flow by measuring crankcase pressure.

It is a further object to this invention to provide an improved fuel control for a two cycle, crankcase compression, internal combustion engine.

It is another object to this invention to provide a pressure sensor for sensing crankcase pressure wherein the pressure signal is sensed at the appropriate time to provide the required data.

In addition to the aforenoted problems, there is also the problem of deterioration of the signal from the pressure sensor during the life of the apparatus. This problem is particularly acute in conjunction with outboard motor applications wherein the air inducted into the engine may contain a large amount of water vapor and which water vapor may be salt water when operating in marine environments. This water vapor can impinge upon the detecting surface of the pressure sensor and if corrosion occurs, then the pressure signal will further deteriorate. It is difficult to provide a continuous correction for such deterioration, which can vary depending upon the particular application.

It is, therefore, a still further object to this invention to provide an improved pressure sensor arrangement for a two cycle, crankcase compression, internal combustion engine wherein the detecting surface of the pressure sensor will be protected from corrosion, even in marine environments.

It is a still further object to this invention to provide an improved pressure sensor for a two cycle, crankcase compression, internal combustion engine.

SUMMARY OF THE INVENTION

This invention is adapted to be embodied in a sensor arrangement for determining the flow to a two cycle, crankcase compression, internal combustion engine comprised of a cylinder, a piston reciprocating in the cylinder and driving a crankshaft that is rotatably journalled within a crankcase chamber. A scavenge port is provided for delivering a charge from the crankcase chamber to a combustion chamber formed by the piston and cylinder. Sensor means are mounted in the engine for sensing the pressure in the crankcase pressure at predetermined angles of the crankshaft related to the opening and closing of the scavenge port.

In accordance with an apparatus constructed in accordance with this invention, the actual crankshaft angle at which pressure is measured is offset from the actual timing of the scavenge port events so as to compensate for lag in the sensor system.

In accordance with a method of practicing the invention, the crankcase pressure signals are sensed at an angle that is offset from the desired angles to compensate for delays in the output signal of the sensor in relation to the actual events of the engine.

Another feature of this invention is adapted to be embodied in a sensor for determining pressure in the crankcase chamber of a two cycle, crankcase compression, internal combustion engine. The crankcase pressure sensor is adapted to be mounted in an opening of a wall that communicates with the crankcase chamber of the engine. The pressure sensor has a detecting surface that is in confronting relationship to the wall opening for receiving and sensing the pressure variations in the crankcase chamber. In accordance with this feature of the invention, an impermeable flexible diaphragm extends across the area of the pressure sensing face adjacent the opening for permitting pressure transmission therethrough while precluding the permeability of water vapor onto the pressure sensing face of the pressure sensor.

DETAILED DESCRIPTION OF THE PREFERRED EMBODIMENTS OF THE INVENTION

Figure 1:
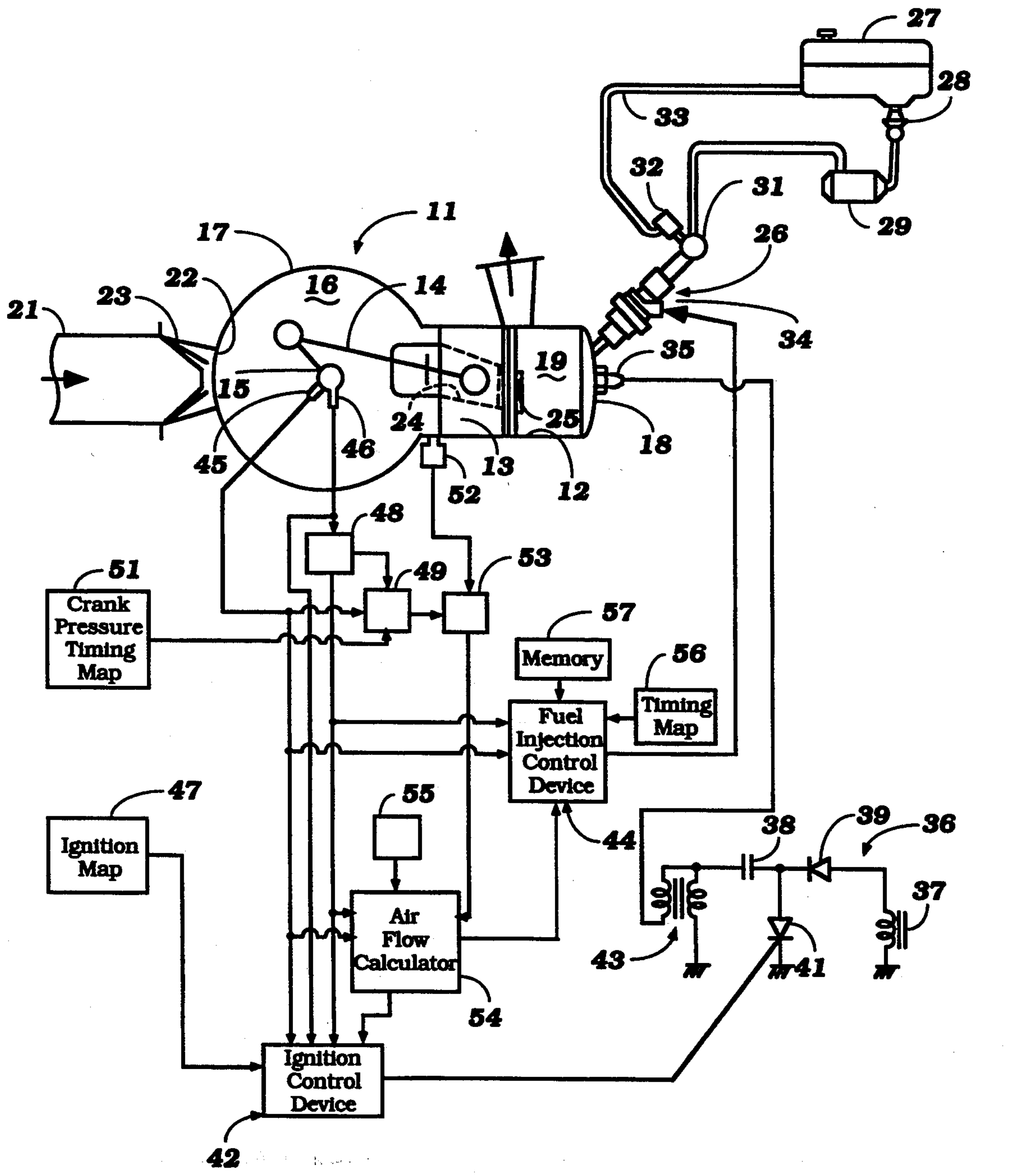
FIG. 1 is a partially schematic, cross sectional view taken through a single cylinder of a multiple cylinder internal combustion engine constructed in accordance with an embodiment of the invention.

Referring now in detail to the drawings and initially to FIG. 1, a single cylinder of a multi-cylinder, two cycle, crankcase compression engine is shown in cross section and is identified generally by the reference numeral 11. The invention is described in conjunction with a single cylinder, because it is believed that those skilled in the art will readily understand how the invention can be practiced with multiple cylinder engines. Also, the engine is depicted in a certain orientation in FIG. 1, as the engine is depicted as being applied to an outboard motor wherein the engine output shaft normally rotates about a vertically extending axis. The application of the engine 11 to an outboard motor is illustrative only, although the invention has particular utility with outboard motors because of the fact that such motors normally employ two cycle, crankcase compression engines.

The engine 11 includes a cylinder block that defines a cylinder bore 12 in which a piston 13 is supported for reciprocation. The piston 13 is connected by means of a connecting rod 14 to a crankshaft 15 that is rotatably journalled within a crankcase chamber 16. The crankcase chamber 16 is defined by a crankcase member 17 that is affixed in a known manner to the skirt of the cylinder block in which the cylinder bores 12 are formed. In addition, a cylinder head 18 is affixed to the cylinder block and defines with the cylinder bore 12 and the head of the piston 13 a variable volume combustion chamber, indicated by the reference numeral 19.

It is to be understood that if the invention is practiced with multiple cylinder engines, the crankcase chamber 16 associated with each of the cylinder bores 12 will be sealed relative to each other, as is well known in two cycle multiple cylinder engine practice.

An intake charge is delivered to each of the crankcase chambers 16 from an atmospheric air inlet (not shown) through an induction system that includes an intake manifold 21. The intake manifold 21 communicates with an intake port 22 formed in the crankcase member 17 and communicating with the crankcase chamber 16. A reed-type check valve 23 is provided so as to permit the air charge to enter the crankcase chamber 16, but to preclude reverse flow when the charge is being compressed therein through downward movement of the piston 13 in the cylinder bore 12.

One or more scavenge passages 24 are formed in the cylinder block and extend from the crankcase chamber 16 to respective scavenge ports 25 formed in the cylinder bore 12, so as to permit the charge which has been compressed in the crankcase chamber 16 to be transferred to the combustion chamber 19.

A fuel charge is delivered to the combustion chambers 19 by a fuel injector, indicated generally by the reference numeral 26 and which is mounted in the cylinder head 18 in a known manner. The fuel injector 26 is supplied with fuel under pressure from a remotely positioned fuel tank 27 by a supply system that includes an in-line fuel filter 28 and a high pressure pump 29. This fuel is delivered to a fuel rail 31 that supplies each of the fuel injectors 26 of the engine 11. A pressure regulator 32 is mounted in the fuel rail 31 and regulates the pressure of the fuel supplied to the fuel injectors 26 by bypassing excess fuel back to the fuel tank 27 through a return line 33. The fuel injector 26 is electrically operated and has a solenoid including a terminal 34 which is energized to initiate the beginning of fuel injection and de-energized to terminate the fuel injection.

A spark plug 35 is mounted in the cylinder head 18 for firing the charge in the combustion chamber 19. The spark plug 35 is fired by an ignition system, indicated generally by the reference numeral 36, which is of the SCR type. This system includes a charging coil 37 of a magneto generator for the engine 11 which charges a charging capacitor 38 through a diode 39.

An SCR 41 is disposed in a ground circuit between the diode 39 and the capacitor 38 and has its gate switched by a control device, indicated generally by the reference numeral 42, and shown in schematic form. When the charging capacitor 38 is grounded by switching the SCR 41 to a conductive state, a voltage will be induced in the primary winding of a spark coil 43 to induce a high voltage in its secondary winding which is connected to the spark plug 35 for firing it in a well known manner.

The construction of the engine 11 as thus far described may be considered to be conventional and, for that reason, further details of the basic engine and the ignition control for it are not believed to be necessary for those skilled in the art to understand the construction and operation of the fuel injection control device, indicated generally by the reference numeral 44 and its associated components and specifically the way in which the amount of air charge to the engine is determined and measured.

Both the ignition control device 42 and the fuel injection control device 44 receive a number of signals from various sensors indicative of both engine running condition and atmospheric or ambient conditions. These sensors include a basic crank angle detecting sensor 45 that cooperates with the crankshaft 15 and gives a signal indicative of a basic angular position of the crankshaft 15. In addition, there is a pulser coil 46 that outputs a signal each time the crankshaft rotates, which signal can be employed so as to provide an indication of engine speed.

Both the crank angle reference position sensor 45 and pulser coil 46 transmit their signals to the ignition control device 42 which then calculates the desired ignition timing from this data and from data contained within a map 47 of the various parameters and the appropriate time to fire the ignition which is determined by the switching of the SCR 41, as aforenoted.

In addition, the pulser coil 46 outputs its signal to an engine speed detector 48 which counts the pulses in a predetermined time period and outputs a signal indicative of engine speed to the ignition control device 42. The speed detector 48 sends the speed signal also to a convertor 49 which also receives crank angle position data from the crankcase position reference sensor 45 as well as crankcase pressure timing information from a map or memory 51. The map or memory 51 indicates when the crankcase pressure signals should be sensed by a crankcase pressure sensor 52 that is mounted in the crankcase chamber 16, in a manner to be described, so as to sense the pressures therein.

The pressure signals are sensed at a time determined by a control or switch 53 which then processes this information to an air flow calculator 54 that receives the pressure signals and compares them. In addition, the air flow calculator 54 receives the crank reference signals from the sensor 46 and engine speed signals from the speed calculator 49 and thus calculates air fuel based upon these sensed signals as determined by a map 55. In addition, the air flow calculator 54 outputs an air flow signal to the ignition control device 42 as this data is also contained in the map 47.

The output from the air flow calculator 54 is transmitted to the fuel injection control device 44 which also receives crank angle position of the reference sensor 45 and engine speed from the speed calculator 48 and compares this data with a timing map 56 and with an output from a memory 57 which also contains information as to the appropriate fuel injection timing.

In accordance with the invention, the crankcase pressure timing map 51 includes an arrangement for appropriately controlling the timing at which the pressure signals are taken by the crankcase pressure sensor 52 so as to compensate for the delay of output of the signal and the engine speed as will now be described in conjunction with FIGS. 2 and 3.

Figure 2:
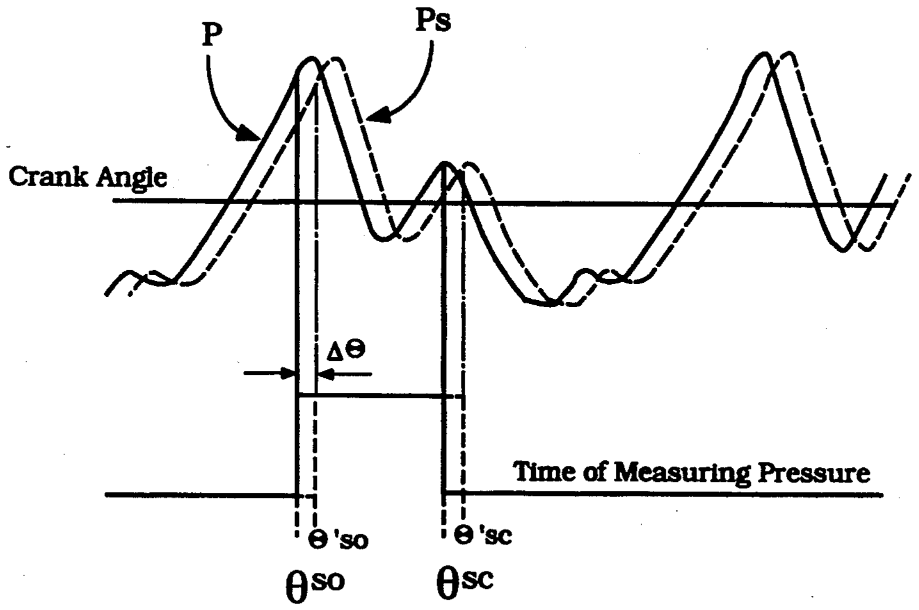
FIG. 2 is a graphical view showing actual crankcase pressure in relation to crankshaft angle by the solid line curve and the pressure signal from the crankcase pressure sensor in response to crank angle by the broken line curve.
Figure 3:
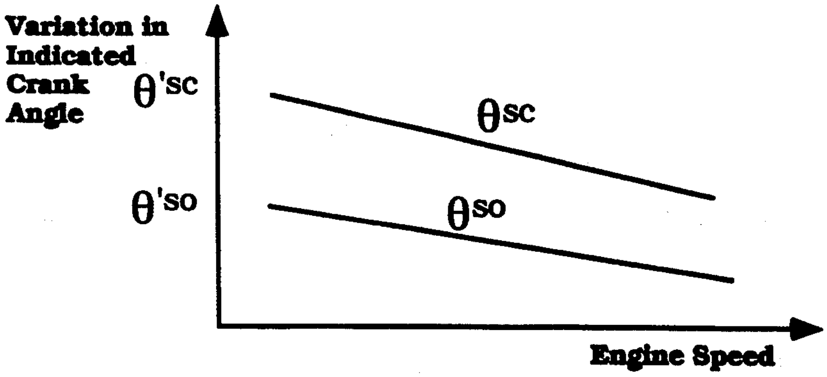
FIG. 3 is a graphical view showing how the variation of pressure signals at scavenge port opening and scavenge port closing generated by the sensor varies with engine speed.

FIG. 2 is a graphical view showing the actual crankcase pressure "P" in the crankcase chamber 16 in relation to crank angle. It will be seen that the pressures varies cyclically during a given rotation of the crankshaft 15 and differences in this pressure, as aforenoted, is indicative of the amount of air actually delivered to the combustion chamber. In order to determine this air flow, the pressure is taken at the angle $\theta^{so}$ when the scavenge port first opens and the pressure is at a point near its peak and a further reading at the crank angle $\theta^{sc}$ which is the point at which the scavenge port closes. It has been demonstrated that air intake volume is related to these two pressure differences.

However, because of the inherent construction of the type of sensor 52 employed, the pressure sensed by the sensor $P_S$ actually lags the actual crankshaft pressure by a fixed angle of offset $\Delta\theta$. The crankcase pressure timing map 51 is designed so as to contain a memory signal which is indicative of this amount of offset so that the pressure sensing control 53 will accommodate the delay in the sensor 52 itself so that the actual pressure measurements will be taken at the angle $\theta'^{so}$ and $\theta'^{sc}$ so that the actual pressure at these times will be recorded.

In addition to the fixed angular offset that is dictated by the inherent inertia of the operation of the crankcase pressure sensor 52, the pressure sensor 52 is electrically operated from the charging coil of the aforenoted magneto generator system. As a result, there is a variation in the actual output signal that is related to engine speed. FIG. 3 shows this relationship where it will be seen that the output signal in terms of an offset of the crank angle varies as a linear function at engine speed with the offset angle decreases as the engine speed increases. Hence, the crankcase pressure timing map 51 also inputs this data to the control 49 so that the pressure signal is sensed at the appropriate angle to compensate for this difference.

Figure 4:
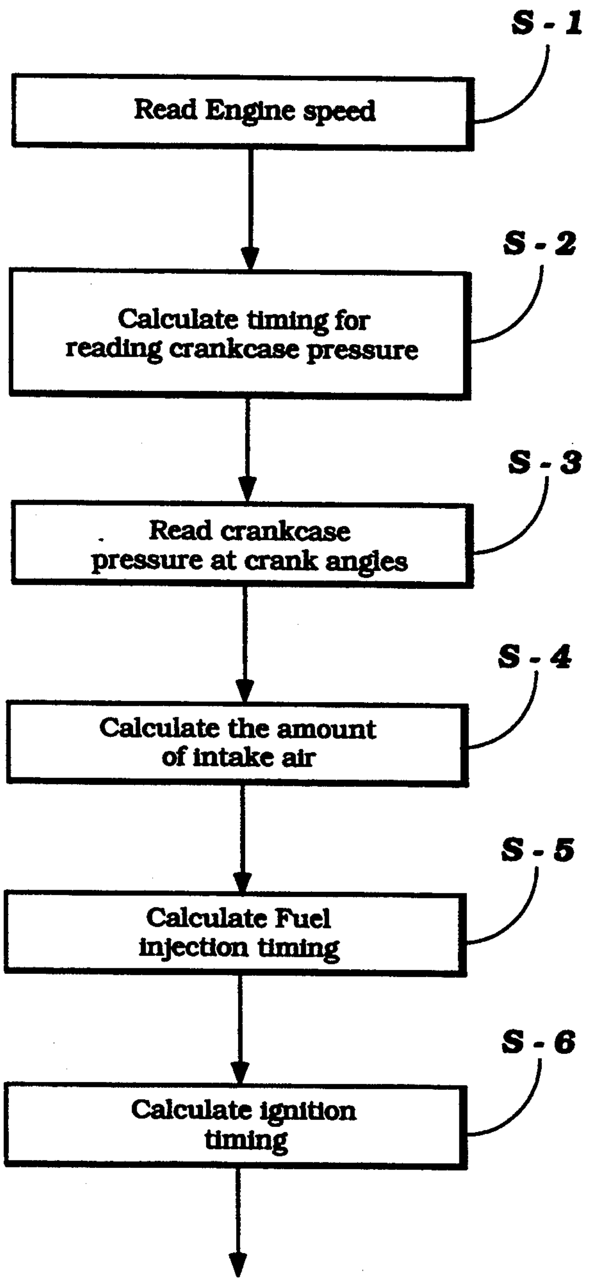
FIG. 4 is a graphical view showing the control routine.

The control routine by which the fuel injection timing and ignition timing are set, may be understood by reference to the block diagram of FIG. 4. In accordance with this program, at the step S-1 the engine speed is read from the engine speed detector 48. The program then moves to the step S-2 so as to calculate the crankshaft angle at which the pressure should be taken to determine the intake air flow by using the correction determined from the maps generated by the data from FIGS. 2 and 3.

At the step S-3, the appropriate crankcase pressure readings are made. The program then moves to the step S-4 so as to calculate the amount of air inducted.

The program then moves to the step S-5 to calculate the fuel injection timing. As has been previously noted, this is done to provide the appropriate beginning angle of fuel injection and also the duration or completion angle of fuel injection. This is actually implemented by the control device 44 using the input information of engine speed and air flow as well as data from the timing map 56 and memory 57.

The program then moves to the step S-6 so as to calculate the appropriate timing of firing of the spark plug 35. Once these calculations are made, then the appropriate events are initiated at the engine.

As has already been noted, the engine 11 is particularly adapted for use in outboard motors and these outboard motors operate many times in a marine environment, as is well known. As a result of this, there is the likelihood that the intake air may also contain a large amount of water vapor which may also include salt water which, as is well known, is highly corrosive. As a result of this, corrosion may occur in the pressure sensor 52 and this can add a further defect in its operation.

Figure 5:
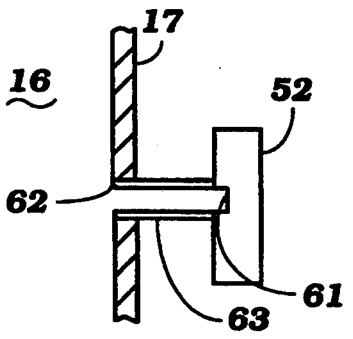
Figure 5 Prior Art
FIG. 5 is a cross sectional view of a prior art type if pressure sensor and mounting therefore.

FIG. 5 shows how the crankcase pressure sensor 52 is mounted in a conventional manner and thus can be subject to corrosion and particularly its pressure sensing face 61, which communicates with the crankcase chamber 16 through an opening 62 in the wall 17 of the crankcase chamber 16. In the prior art type of construction, the pressure sensing face 61 is connected by an interconnecting pipe 63 with the chamber 16. Water vapor thus can impact on the face 61 and cause corrosion.

Figure 6:
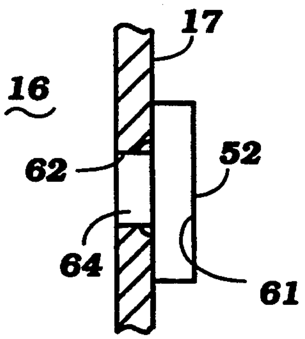
FIG. 6 is a cross sectional view, in part similar to FIG. 5, and shows how the pressure sensor of this invention is protected from corrosion.

In the embodiment of FIG. 6, a plastic diaphragm 64 is provided in the opening 62 which will deform and transmit the pressure will protect the face 61 from the water vapor and corrosion. Thus the problems attendant with the prior art are avoided.

It should be readily apparent that the foregoing embodiments of the invention are very effective in permitting extremely accurate air flow measurements to the crankcase chamber, even bearing in mind the delay in reaction time of the sensor and the fact that the sensor signal may vary with engine speed. Of course, the foregoing description is that of preferred embodiments of the invention and various changes and modifications may be made without departing from the spirit and scope of the invention, as defined by the appended claims.

I claim:

1. A sensor arrangement for detecting the air flow to a two cycle, crankcase compression engine comprising a cylinder, a piston reciprocating within said cylinder, a crankcase chamber at one end of said cylinder, a crankshaft rotatably journalled within said crankcase chamber, a connecting rod connecting said piston to said crankshaft for driving said crankshaft, a scavenge port for delivering a charge from said crankcase chamber to a combustion chamber formed by said cylinder and said piston, sensor means for sensing the pressure within said crankcase chamber, means for determining the pressure in said crankcase at specific angular positions of said crankshaft for measuring air flow to said engine combustion chamber, and means for adjusting the angle at which pressure is measured to compensate for differences between the actual crankcase pressure and the crankcase pressure signal from the sensor.

2. A sensor arrangement as set forth in claim 1 wherein the timing of the reading of the pressure by the sensor means coincides with the opening of the scavenge port.

3. A sensor arrangement as set forth in claim 2 wherein the timing of making the measurement is adjusted to compensate for the inertial delay in the sensor.

4. A sensor arrangement as set forth in claim 3 wherein the sensor is operated by electric power generated by the engine.

5. A sensor arrangement as set forth in claim 4 wherein the measurement angle is adjusted also in response to engine speed to compensate for variations in the electrical output generated by the engine.

6. A sensor arrangement as set forth in claim 1 wherein the time at which pressure is measured is at the time of scavenge port closing.

7. A sensor arrangement as set forth in claim 6 wherein the timing of making the measurement is adjusted to compensate for the inertial delay in the sensor.

8. A sensor arrangement as set forth in claim 7 wherein the sensor is operated by electric power generated by the engine.

9. A sensor arrangement as set forth in claim 8 wherein the measurement angle is adjusted also in response to engine speed to compensate for variations in the electrical output generated by the engine.

10. A sensor arrangement as set forth in claim 6 wherein the pressure is also measured at the time of scavenge port opening.

11. A sensor arrangement as set forth in claim 10 wherein the timing of making the measurement is adjusted to compensate for the inertial delay in the sensor.

12. A sensor arrangement as set forth in claim 11 wherein the sensor is operated by electric power generated by the engine.

13. A sensor arrangement as set forth in claim 12 wherein the measurement angle is adjusted also in response to engine speed to compensate for variations in the electrical output generated by the engine.

14. A sensor arrangement as set forth in claim 1 wherein the sensor means has a pressure sensing surface and communicates with the crankcase chamber through an opening across which a flexible diaphragm is provided that contacts said pressure sensing surface, said diaphragm being sufficiently flexible so as to permit the transmission of pressure forces to said pressure sensing surface while being impervious to water vapor for protecting said pressure sensing surface from corrosion.

15. The method of measuring air flow in a two cycle, crankcase compression engine comprising a cylinder, a piston reciprocating in the cylinder, a crankcase chamber formed at one end of the cylinder, a crankshaft rotatably journaled within the crankcase chamber, a connecting rod driving the crankshaft from the piston, a scavenge port for delivering a charge from the crankcase chamber to a combustion chamber formed by the cylinder and piston, and sensor means for sensing the pressure within the crankcase chamber, said method comprising the steps of reading the pressure in the crankcase chamber from the sensor means at a predetermined, crankshaft angle, and adjusting the angle at which the sensor means is read to accommodate variations in the output of the sensor.

16. The method as set forth in claim 15 wherein the timing of the reading of the pressure by the sensor means coincides with the opening of the scavenge port.

17. The method as set forth in claim 16 wherein the timing of making the reading is adjusted to compensate for the inertial delay in the sensor.

18. The method as set forth in claim 17 wherein the sensor is operated by electric power generated by the engine.

19. The method as set forth in claim 18 wherein the reading angle is adjusted also in response to engine speed to compensate for variations in the electrical output generated by the engine.

20. The method as set forth in claim 15 wherein the time at which pressure is read is at the time of scavenge port closing.

21. The method as set forth in claim 20 wherein the timing of making the reading is adjusted to compensate for the inertial delay in the sensor.

22. The method as set forth in claim 21 wherein the sensor is operated by electric power generated by the engine.

23. The method as set forth in claim 22 wherein the reading angle is adjusted also in response to engine speed to compensate for variations in the electrical output generated by the engine.

24. The method as set forth in claim 20 wherein the pressure is also read at the time of scavenge port opening.

25. The method as set forth in claim 24 wherein the timing of making the reading is adjusted to compensate for the inertial delay in the sensor.

26. The method as set forth in claim 25 wherein the sensor is operated by electric power generated by the engine.

27. The method as set forth in claim 26 wherein the measurement angle is adjusted also in response to engine speed to compensate for variations in the electrical output generated by the engine.

* * * * *